United States Patent
Wang et al.

(10) Patent No.: US 11,873,917 B2
(45) Date of Patent: Jan. 16, 2024

(54) WATER INLET SOLENOID VALVE CAPABLE OF IMPROVING ELECTROMAGNETIC ATTRACTION AND IMPLEMENTING METHOD THEREFOR

(71) Applicant: JIANGMEN TIANDI ELECTRICAL APPLIANCE CO., LTD, Guangdong (CN)

(72) Inventors: Hongbiao Wang, Guangdong (CN); Lin Ao, Guangdong (CN)

(73) Assignee: JIANGMEN TIANDI ELECTRICAL APPLIANCE CO., LTD, Guangdong (CN)

(*) Notice: Subject to any disclaimer, the term of this patent is extended or adjusted under 35 U.S.C. 154(b) by 43 days.

(21) Appl. No.: 17/762,580

(22) PCT Filed: Sep. 1, 2020

(86) PCT No.: PCT/CN2020/112858
§ 371 (c)(1),
(2) Date: Mar. 22, 2022

(87) PCT Pub. No.: WO2021/057409
PCT Pub. Date: Apr. 1, 2021

(65) Prior Publication Data
US 2022/0333713 A1    Oct. 20, 2022

(30) Foreign Application Priority Data

Sep. 23, 2019  (CN) .......................... 201910898273.5

(51) Int. Cl.
*F16K 31/06* (2006.01)
(52) U.S. Cl.
CPC ................................ *F16K 31/0675* (2013.01)

(58) Field of Classification Search
CPC .. F16K 27/029; F16K 27/048; F16K 31/0655; F16K 31/0675; F16K 31/404;
(Continued)

(56) References Cited

U.S. PATENT DOCUMENTS 3,917,218 A * 11/1975 Marocco ............... F16K 31/404
251/38
5,299,592 A *  4/1994 Swanson ............... F16K 31/404
137/59

(Continued)

FOREIGN PATENT DOCUMENTS

CN    201221615 Y    4/2009
CN    102537482 A    7/2012
(Continued)

*Primary Examiner* — Matthew W Jellett
(74) *Attorney, Agent, or Firm* — Greer, Burns & Crain, Ltd.

(57) ABSTRACT

The present invention discloses a solenoid valve for water capable of enhancing a electromagnetic suction force and an implementation method thereof. the method comprises: obtaining a plastic-sealed stator assembly by injecting plastic on a stator assembly, the plastic-sealed stator assembly; assembling the plastic-sealed stator assembly and a valve body assembly comprising a movable iron core together to form the solenoid valve for water; wherein the upper end face of the movable iron core at the initial position is set as not lower than the upper edge of lower magnetic conductive inner sleeve and not higher than ¼ of the distance from the upper edge of lower magnetic conductive inner sleeve to the lower edge of upper magnetic conductive inner sleeve, so as to enhance the electromagnetic suction force of the solenoid valve for water. The plastic-sealed stator assembly comprises a coil assembly; an upper magnetic conductive inner sleeve and a lower magnetic conductive inner sleeve mounted in a hole of the coil assembly; a water-isolating sleeve located inside the upper magnetic conductive inner (Continued)

sleeve and the lower magnetic conductive inner sleeve; a yoke located outside the coil assembly and connecting the upper magnetic conductive inner sleeves and the lower magnetic conductive inner sleeves; a magnetic conductive seat mounted on an inner side of the water-isolating sleeve; and a plastic-sealed layer covering the coil assembly and the yoke.

12 Claims, 6 Drawing Sheets

(58) Field of Classification Search
CPC ......... B29C 45/14614; B29C 45/14622; B29L 2031/7506
See application file for complete search history.

(56) References Cited

U.S. PATENT DOCUMENTS

| | | | | |
|---|---|---|---|---|
| 5,358,215 A * | 10/1994 | Buth | ................... | B60G 17/056 251/129.21 |
| 5,599,003 A * | 2/1997 | Seemann | .......... | F16K 31/52408 251/38 |
| 5,676,342 A * | 10/1997 | Otto | ...................... | F16K 31/404 251/38 |
| 5,941,502 A * | 8/1999 | Cooper | ................. | F16K 27/029 335/260 |
| 6,076,550 A * | 6/2000 | Hiraishi | ................ | H01F 7/1607 251/38 |
| 7,143,992 B2 * | 12/2006 | Sassone | ................. | G05D 7/012 251/118 |
| 8,936,041 B2 * | 1/2015 | Yun | ........................ | F16K 31/082 251/38 |
| 9,033,305 B2 * | 5/2015 | Schreier | ................. | F16K 31/00 251/30.01 |
| 9,366,358 B2 * | 6/2016 | Da Pont | .............. | F16K 31/0675 |
| 9,423,046 B2 * | 8/2016 | Bamber | .................. | H01F 7/081 |
| 9,453,584 B2 * | 9/2016 | Wang | .................. | F16K 31/0655 |
| 2008/0283789 A1 * | 11/2008 | Rubio | ................... | F16K 31/404 251/324 |
| 2013/0075634 A1 | 3/2013 | Ro et al. | | |
| 2013/0264507 A1 * | 10/2013 | Schnelker | ............... | F16K 31/04 251/129.15 |
| 2020/0132210 A1 * | 4/2020 | Lai | ...................... | F16K 27/0236 |

FOREIGN PATENT DOCUMENTS

| | | |
|---|---|---|
| CN | 102913670 A | 2/2013 |
| CN | 107725786 A | 2/2018 |
| CN | 207921386 U | 9/2018 |
| KR | 20070051110 A | 5/2007 |
| KR | 20190000119 U | 1/2019 |

* cited by examiner

WATER INLET SOLENOID VALVE CAPABLE OF IMPROVING ELECTROMAGNETIC ATTRACTION AND IMPLEMENTING METHOD THEREFOR

CROSS-REFERENCE TO RELATED APPLICATIONS

This application is a U.S. National Stage Application of PCT/CN2020/112858 assigned the international filing date of Sep. 1, 2020 and claiming the benefit of priority from CN patent application 201910898273.5 filed Sep. 23, 2019, the disclosure of both applications is herein incorporated by reference.

TECHNICAL FIELD

The present invention relates to the technical field of manufacture of solenoid valve for water, and in particular to a solenoid valve for water capable of increasing electromagnetic suction force and a implementation method thereof.

BACKGROUND ART

A solenoid valve for water (or water inlet valve) functions to control supply or cut off of water source. Since water has a certain pressure during operation, it can be designed as a packless pilot-operated solenoid valve for water. FIG. 1 shows the structure of a solenoid valve for water that is currently more commonly used, including an plastic-sealed layer 116 for plastic-sealing a coil winding, a magnetic yoke 111 mounted on the outside of the plastic sealed layer, a plug 107, a water inlet 215 and a water outlet 216.

FIG. 1 shows a solenoid valve for water consisting essentially of two parts, a pilot valve and a primary valve. When a winding 109 is not energized, a movable iron core 201 falls due to the self-weight and the reaction force of the return spring, and closes a flow-through hole 210 of a primary valve plug 203, so that the water entering the upper cavity of the valve plug from a balanced hole 213 cannot leak out, and due to the difference in effective bearing areas on and below the valve diaphragm, a pressure difference is formed, so that the valve plug diaphragm is pressed against the primary valve seat, and the valve is closed. When the winding 109 is energized, the magnetic attraction draws the movable iron core 201 up, and the water in the upper cavity 211 of the valve plug is discharged to an outlet of the valve through the flow-through hole 210. Since the flow capacity of the flow-through hole is designed to be much greater than the flow capacity of the balanced hole 213, a sufficient pressure loss is generated on the balanced hole 213 by the water flow, the pressure in the upper cavity 211 of the valve plug sharply decreases, while the pressure in the lower cavity 212 of the valve plug maintains the same as the pressure of the inlet, so that the pressure difference between the upper and lower sides of the valve plug diaphragm causes the valve plug diaphragm to bulge upwards, the valve is opened.

The major problem of the solenoid valve for water shown in FIG. 1 is that a water-isolating sleeve 117 needs to be separately manufactured, and the manufactured water-isolating sleeve is inserted into the magnetic conductive inner sleeve by means of assembly, so the water-isolating sleeve 117 installed in a middle hole of a coil rack 104 needs to have a certain thickness in order to withstand the pressure impact when the valve is closed and the possible structural damage during mechanical assembly, resulting in that the non-working air gap of the existing solenoid valve for water is greater than 1.5 mm, thus requiring more electromagnetic force to make the movable iron core act; in addition, manufacturing the water-isolating sleeve separately increases the manufacturing cost. In addition, since the yoke 111 is mounted to the outside of the plastic-sealed layer 116 of the plastic-sealed coil winding, the yoke 111 must be welded together with the magnetic conductive inner sleeve in order to fix the yoke to the coil rack via the magnetic conductive inner sleeve, which the welding process and manufacturing cost are increased.

The winding enameled wires of the solenoid valves for waters in the market all use copper wires, with a total amount of about 26.5-28 g. Reducing the amount of copper wire is the most straightforward way to reduce cost. However, reducing the amount of copper wires will inevitably affect the performance of the solenoid valves for waters. By improving the magnetic circuit structure, the usage of copper wire can be reduced under the condition of maintaining or even improving the performance level of the water inlet valve, and the balance between performance and cost can be achieved, which is the problem to be solved by the invention.

SUMMARY OF THE INVENTION

It is an object of the present invention to provide a solenoid valve for water capable of elevating a electromagnetic force and an method thereof for enhancing a electromagnetic force acting on a movable iron core and simplifying a production process for manufacturing the solenoid valve for water and reducing a production cost.

According to a first aspect of the present invention, a implementation method of a solenoid valve for water capable of enhancing electromagnetic suction force of solenoid valve for water, which comprises:
  obtaining a plastic-sealed stator assembly by injecting plastic on a stator assembly, the plastic-sealed stator assembly comprising:
    a coil assembly;
    an upper magnetic conductive inner sleeve and a lower magnetic conductive inner sleeve mounted in a hole of the coil assembly;
    a water-isolating sleeve located inside the upper magnetic conductive inner sleeve and the lower magnetic conductive inner sleeve;
    a yoke located outside the coil assembly and connecting the upper magnetic conductive inner sleeves and the lower magnetic conductive inner sleeves;
    a magnetic conductive seat mounted on an inner side of the water-isolating sleeve; and
    a plastic-sealed layer covering the coil assembly and the yoke;
  assembling the plastic-sealed stator assembly and a valve body assembly comprising a movable iron core together to form the solenoid valve for water;
  wherein the upper end face of the movable iron core at the initial position is set as not lower than the upper edge of lower magnetic conductive inner sleeve and not higher than ¼ of the distance from the upper edge of lower magnetic conductive inner sleeve to the lower edge of upper magnetic conductive inner sleeve, so as to enhance the electromagnetic suction force of the solenoid valve for water.

Preferably, a length of the movable iron core in the lower magnetic conductive inner sleeve at the initial position is set as not less than ¼ of a sum of the heights of the upper and lower magnetic conductive inner sleeves. In this way, core material can be saved.

Preferably, a gap between the upper magnetic conductive inner sleeve and the lower magnetic conductive inner sleeve is between 2 mm and 5 mm; the diameter of the movable iron core is reduced from 6 mm to 5±0.1 mm; the inner diameter of the upper magnetic conductive inner sleeve and the lower magnetic conductive inner sleeve is 6.5±0.1 mm, its wall thickness is 1 mm, and its outer diameter is 8.5±0.1 mm; the water-isolating sleeve has an inner diameter of 5.5±0.1 mm and an outer diameter of 6.5±0.1 mm; and the weight of the magnetic conductive seat is not less than 60% of the weight of the movable iron core.

Preferably, injection plastic is carried out on the inner sides of the upper magnetic inner sleeve and the lower magnetic inner sleeve which are installed in the coil assembly, so as to form the water-isolating sleeve on the inner sides of the upper magnetic inner sleeve and the lower magnetic inner sleeve.

Preferably, a water-isolating sleeve assembly comprising a water-isolating sleeve formed inside the upper magnetic conductive inner sleeve and the lower magnetic conductive inner sleeve is manufactured by injecting plastic on the upper magnetic conductive inner sleeve, a stopper and the lower magnetic conductive inner sleeve placed together as an insert; the water-isolating sleeve assembly is then mounted into a hole of the coil assembly.

Preferably, the upper magnetic conductive inner sleeve and the lower magnetic conductive inner sleeve are cylindrical and the wall of the cylinder is provided with radial through holes for glue passage.

Preferably, the inner surfaces of the upper magnetic conductive inner sleeve and the lower magnetic conductive inner sleeve are provided with axial magnetic conductive inner sleeve grooves that communicate with the radial through holes.

Preferably, by injecting plastic into the hole of the coil rack provided with the upper magnetic inner sleeve and the lower magnetic inner sleeve, the injected plastic used for forming the water-isolating sleeve flows into the radial through hole along the axial magnetic conductive inner sleeve grooves, thus forming the root for fixing the water-isolating sleeve.

According to a second aspect of the present invention, a solenoid valve for water capable of enhancing a electromagnetic suction force, which comprises:
a plastic-sealed stator assembly comprising:
  a coil assembly;
  an upper magnetic conductive inner sleeve and a lower magnetic conductive inner sleeve mounted in a hole of the coil assembly;
  a water-isolating sleeve located inside the upper magnetic conductive inner sleeve and the lower magnetic conductive inner sleeve;
  a yoke located outside the coil assembly and connecting the upper magnetic conductive inner sleeves and the lower magnetic conductive inner sleeves;
  a magnetic conductive seat mounted on an inner side of the water-isolating sleeve; and
  a plastic-sealed layer covering the coil assembly and the yoke;
a valve body assembly comprising a movable iron core, for assembling with the plastic-sealed stator assembly to form the solenoid valve for water;
wherein the upper end face of the movable iron core at the initial position is set as not lower than the upper edge of lower magnetic conductive inner sleeve and not higher than ¼ of the distance from the upper edge of lower magnetic conductive inner sleeve to the lower edge of upper magnetic conductive inner sleeve, so as to enhance the electromagnetic suction force of the solenoid valve for water.

Preferably, a length of the movable iron core in the lower magnetic conductive inner sleeve at the initial position is set as not less than ¼ of a sum of the heights of the upper and lower magnetic conductive inner sleeves.

Preferably, a gap between the upper magnetic conductive inner sleeve and the lower magnetic conductive inner sleeve is between 2 mm and 5 mm; the diameter of the movable iron core is reduced from 6 mm to 5±0.1 mm; the inner diameter of the upper magnetic conductive inner sleeve and the lower magnetic conductive inner sleeve is 6.5±0.1 mm, its wall thickness is 1 mm, and its outer diameter is 8.5±0.1 mm; the water-isolating sleeve has an inner diameter of 5.5±0.1 mm and an outer diameter of 6.5±0.1 mm; and the weight of the magnetic conductive seat is not less than 60% of the weight of the movable iron core.

Preferably, injection plastic is carried out on the inner sides of the upper magnetic inner sleeve and the lower magnetic inner sleeve which are installed in the coil assembly, so as to form the water-isolating sleeve on the inner sides of the upper magnetic inner sleeve and the lower magnetic inner sleeve.

Preferably, a water-isolating sleeve assembly comprising a water-isolating sleeve formed inside the upper magnetic conductive inner sleeve and the lower magnetic conductive inner sleeve is manufactured by injecting plastic on the upper magnetic conductive inner sleeve, a stopper and the lower magnetic conductive inner sleeve placed together as an insert; the water-isolating sleeve assembly is then mounted into a hole of the coil assembly.

Preferably, the upper magnetic conductive inner sleeve and the lower magnetic conductive inner sleeve are cylindrical and the wall of the cylinder is provided with radial through holes for glue passage.

Preferably, the inner surfaces of the upper magnetic conductive inner sleeve and the lower magnetic conductive inner sleeve are provided with axial magnetic conductive inner sleeve grooves that communicate with the radial through holes.

Preferably, by injecting plastic into the hole of the coil rack provided with the upper magnetic inner sleeve and the lower magnetic inner sleeve, the injected plastic used for forming the water-isolating sleeve flows into the radial through hole along the axial magnetic conductive inner sleeve grooves, thus forming the root for fixing the water-isolating sleeve.

With respect to the prior art, it is an advantageous technical effect of the present invention that the improvement of the magnetic circuit structure enhances the end surface suction force generated by the main magnetic flux, so that the total electromagnetic suction force is greater when the valve is activated and the low pressure activation performance is better.

In addition, by forming a water-isolating sleeve on the inner surfaces of the upper magnetic conductive inner sleeve and the lower magnetic conductive inner sleeve by injecting plastic, the thickness of the water-isolating sleeve can be greatly reduced, thereby enhancing the electromagnetic force acting on the movable iron core.

On the other hand, by fixing the yoke and the coil assembly together by injecting plastic, the production process for manufacturing the solenoid valve for water can be simplified, the production cost can be reduced, and the product quality can be improved.

The present invention will be described in detail below with reference to the accompanying drawings and embodiments, so as to further understand the content, features and technical effects of the present invention.

BRIEF DESCRIPTION OF THE DRAWINGS

FIGS. 12-14 are schematic views of another embodiment of the present invention for forming a water-isolating sleeve, wherein FIG. 12 shows the positional relationship of an upper magnetic conductive inner sleeve, a lower magnetic conductive inner sleeve and a stopper as an insert, FIG. 13 is a perspective view of a water-isolating sleeve assembly formed by injecting plastic on the upper magnetic conductive inner sleeve, the lower magnetic conductive inner sleeve and the stopper as a inserts, and FIG. 14 is a sectional view of the water-isolating sleeve assembly.

Figure 1:
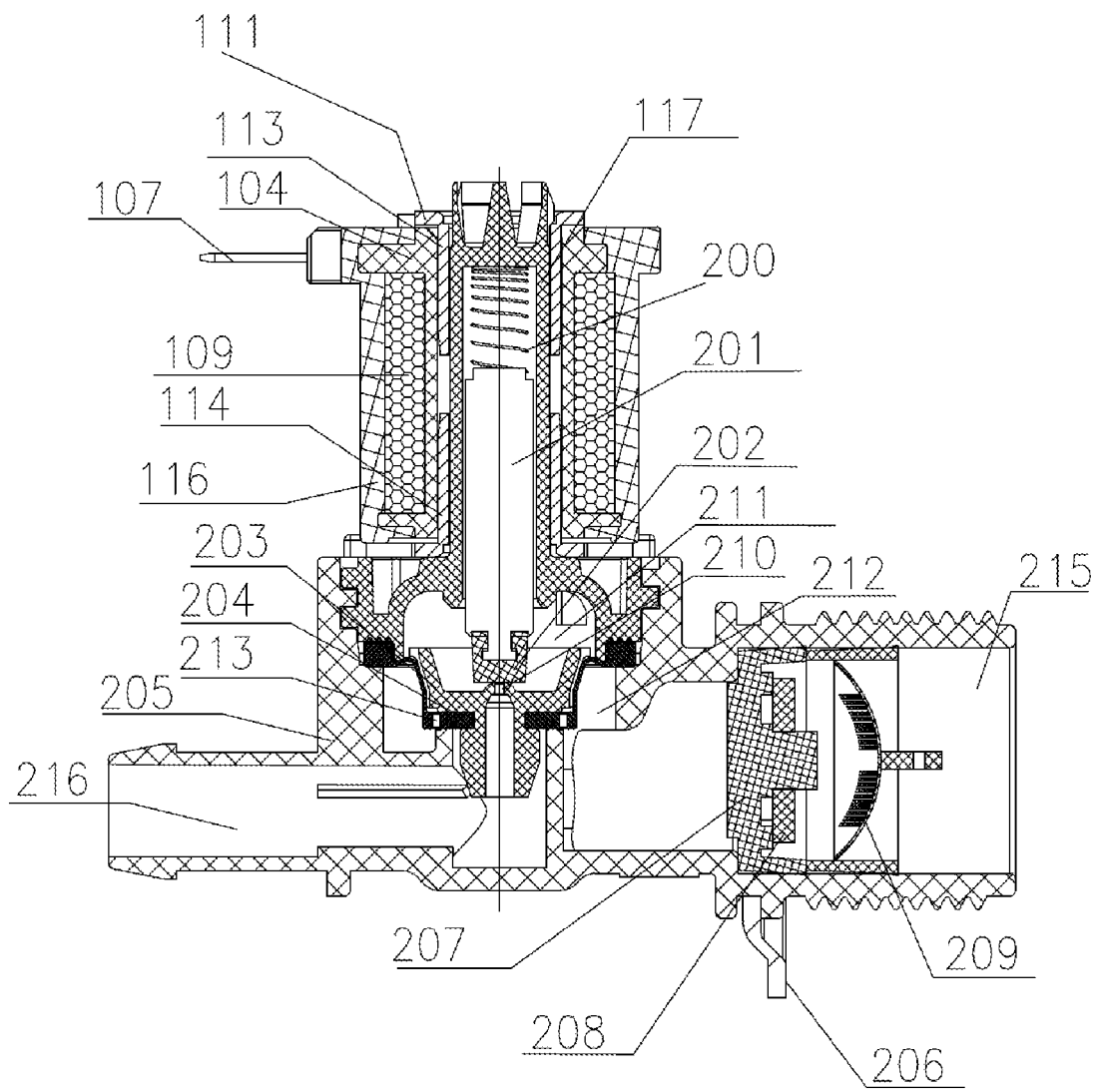
FIG. 1 is a schematic view showing a structure of a conventional solenoid valve for water.

Description of reference numerals: stator assembly with a water-isolating sleeve-100; primary plastic-sealed stator assembly-101; stator assembly 102; coil assembly-103; coil rack-104; yoke positioning boss-105; magnetic conductive inner sleeve positioning ring-106; insert-107; electronic components-108; coil winding-109; yoke-111; yoke positioning groove-112; upper magnetic conductive inner sleeve-113; lower magnetic conductive inner sleeve-114; magnetic conductive inner sleeve glue passing hole-115; plastic-sealed layer-116; water-isolating sleeve-117; water-isolating sleeve base-118; inner cavity of water-isolating sleeve-119; magnetic conductive seat-121; magnetic conductive inner sleeve axial inner groove-122; magnetic conductive inner sleeve joint seam-123; return spring-200; movable iron core-201; flow-through hole plug rubber-202; valve plug-203; valve plug rubber-204; valve body 205; mounting rack-206; pressure relief ring-207; rubber gasket-208; filter screen assembly-209; flow-through hole-210; valve plug upper cavity-211; valve plug lower cavity-212; balanced hole-213; water inlet-215; water outlet-216.

DETAILED DESCRIPTION OF THE INVENTION

The present invention starts from the structure of a coil rack, a magnetic conductive inner sleeve, a water-isolating sleeve, a movable iron core and a magnetic conductive base, and enhance the electromagnetic suction force when a water inlet valve is started by improving a magnetic circuit structure, the wire consumption is reduced and the cost is reduced under the condition of meeting the minimum starting voltage requirement.

The magnetic circuit of the solenoid valve for water of the present invention is composed of a yoke, a magnetic conductive seat, an upper magnetic conductive inner sleeve, a movable iron core and a lower magnetic conductive inner sleeve.

Figure 2:
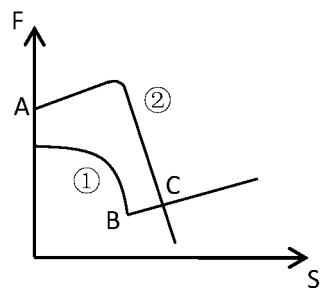
FIG. 2 is a diagram illustrating a load reaction force of a movable iron core with respect to a stroke of the movable iron core.

FIG. 2 shows the relationship between load reaction force of the movable iron core and the stroke of the movable iron core, and the load reaction force characteristic acting on the movable iron core in operation is shown as curve 1 in FIG. 2. In the F-S coordinate system, F is a load reaction force acting on the movable iron core, and S is a suction stroke of the movable iron core. The load reaction force is mainly composed of the force F1 of water acting on the movable iron core, the self-weight G of the movable iron core and the elastic force F2 of the spring, wherein F1 and F2 are significant and varied. When the movable iron core closes the flow-through hole, F1 is equal to the product of the water source pressure and the cross-sectional area of the flow-through hole, and point A in the figure corresponds to the closed valve state; at the initial stage of the movable iron core rising after the power-on, since the valve plug diaphragm also rises, the flow-through hole fails to be unblocked, the pressure of the upper cavity of the valve plug still has a downward action force on the movable iron core, but has been continuously reduced; the spring is then compressed and the spring force is intensified. Since F1 decreases faster than F2 increases, the first half of curve 1 decreases slowly. At point B, the valve plug diaphragm fully rises, the flow-through hole is unblocked, F1 completely disappears, and the load reaction force rapidly drops to the lowest point; thereafter, the movable iron core rises against F2, and the slope of the inclined line segment after point B is the elastic coefficient of the spring.

In order to adapt to the load reaction force characteristic, the electromagnetic suction force characteristic acting on the movable iron core is as shown in FIG. 2. The relative positions of the upper magnetic conductive inner sleeve and the lower magnetic conductive inner sleeve and the movable iron core plays an important role in the specific effect of electromagnetic suction force. A working air gap exists between the movable iron core and the upper magnetic conductive inner sleeve, and a main non-working air gap is formed between the movable iron core and the lower magnetic conductive inner sleeve. Before the movable iron core is not sucked into the upper magnetic conductive inner sleeve, the magnetic potential mainly falls in the working air gap; the electromagnetic suction force includes the electromagnetic force generated by the leakage flux on the side surface of the movable iron core and the end surface suction force generated by the main magnetic flux; when the upper end surface of the movable iron core is close to the lower edge of the upper magnetic conductive inner sleeve, the effect of the end surface suction force is greater; the closer the upper end surface is to the lower edge of the upper magnetic inner sleeve, the greater the total electromagnetic suction force, and the maximum value is reached when the movable iron core is about to enter the upper magnetic conductive inner sleeve. After the movable iron core is sucked into the upper magnetic conductive inner sleeve, the length of the working air gap does not change, and the area of the air gap increases with the depth of the movable iron core, the working air gap magnetic quickly increases to a degree that can be compared with the non-working air gap magnetic conductance, so that the working air gap magnetic pressure drop decreases proportionally and the electromagnetic suction force thus decreases. The descending section of the electromagnetic suction force characteristic curve and the ascending section of the load reaction characteristic curve intersect at point C, the movable iron core is completed, and the solenoid valve for water is also conducted.

In view of the fact that the movable iron core must have a certain suction stroke, magnetic leakage exists in the gap between the upper magnetic inner sleeve and the lower magnetic inner sleeve, and the magnetic seat is installed in the upper magnetic inner sleeve, the present invention improves the magnetic circuit structure as follows:

1. the upper end face of the movable iron core at the initial position (equivalent to the position where the movable iron core is located before power-on) is not lower than the upper edge of the lower magnetic conductive inner sleeve, and is not higher than ¼ of the distance between the upper edge of the lower magnetic conductive inner sleeve and the lower edge of the upper magnetic conductive inner sleeve, so that the upper end face of the movable iron core at the initial position is slightly higher than the upper edge of the lower magnetic conductive inner sleeve, such that the magnetic leakage of the gap between the upper edge of the lower magnetic conductive inner sleeve and the lower edge of the upper magnetic conductive inner sleeve fully acts on the movable iron core at the initial position, and ensures that the movable iron core has a reliable suction stroke, thereby improving the reliability of suction.
2. the socket length between the movable iron core at the initial position and the lower magnetic conductive inner sleeve (equivalent to the length of the movable iron core at the initial position in the lower magnetic conductive inner sleeve) is not less than ¼ of a sum of the heights of the upper magnetic conductive inner sleeve and the lower magnetic conductive inner sleeve, i.e., the length of the movable iron core can be less than the length of the lower magnetic conductive inner sleeve, but is greater than or equal to ½ of the length of the lower magnetic conductive inner sleeve, so as to ensure that the magnetic conduction of the non-operating air gap is not too small, the iron core being saturated, and improve the ability of the solenoid valve for water to bear a large impulse current impact.

The specific numerical values are set as follows:

a gap between the upper magnetic conductive inner sleeve and lower magnetic conductive inner sleeve is 2 to 5 mm;

the weight of magnetic conductive seat shall not be less than 60% of movable iron core;

the diameter of the movable iron core is reduced from 6 mm to 5±0.1 mm;

the inner diameter of the water-isolating sleeve is 5.5±0.1 mm, the wall thickness is 0.5 mm, and the outer diameter is 6.5±0.1 mm;

the inner diameter of the magnetic conductive inner sleeve is 6.5±0.1 mm, the wall thickness is 1 mm, and the outer diameter is 8.5±0.1 mm;

the aperture of the hole in the coil rack is about 8.7 mm; and the coil rack wall thickness is reduced from 1 mm to 0.4 mm.

As a result of the reduced diameter of the moving iron core, the noise generated by the attractive collision between the magnetized magnetic conductive seat and the moving iron core is also reduced when the coil winding is energized. The apertures of the water-isolating sleeve, the upper magnetic conductive inner sleeve and the lower magnetic conductive inner sleeve and the coil rack are reduced to accommodate the reduction of the diameter of the movable iron core. When the aperture of the coil rack is reduced, the copper wire consumption is reduced, the winding resistance is reduced and the current is increased under the condition that the number of winding turns and the wire diameter are unchanged, which improves the solenoid attraction and low voltage starting performance.

Figure 3:
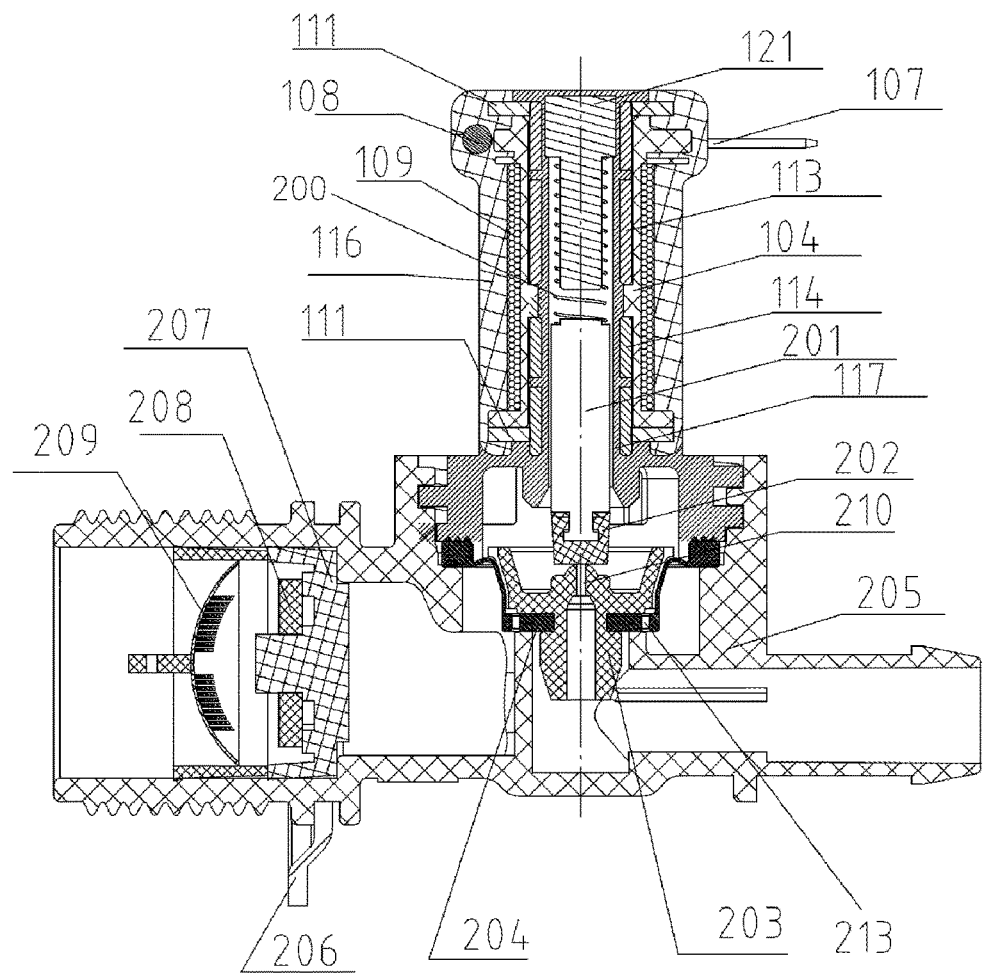
FIG. 3 is a sectional view of a solenoid valve for water of the present invention.

The present invention provides an implementation method of a solenoid valve for water capable of improving a electromagnetic suction force, which comprises:

obtaining a plastic-sealed stator assembly by injecting plastic on a stator assembly;

assembling the plastic-sealed stator assembly and a valve body assembly comprising a movable iron core 201 together to form the solenoid valve for water;

as shown in FIG. 3, the plastic-sealed stator assembly of the present invention comprises: a coil assembly 103 having a coil rack 104, a coil winding 109 wound on the coil rack 104, an insert 107 and an electronic component 108 mounted on the coil rack 104 (see FIG. 5); an upper magnetic conductive inner sleeve 113 and a lower magnetic conductive inner sleeve 114 mounted in the hole of the coil assembly; a water-isolating sleeve 117 located inside the upper magnetic conductive inner sleeve 113 and the lower magnetic conductive inner sleeve 114; a yoke 111 located outside the coil assembly and connecting the upper magnetic conductive inner sleeve 113 and the lower magnetic conductive inner sleeve 114; a magnetic conductive seat 121 mounted inside the upper water-isolating sleeve 117; and a plastic-sealed layer 116 covering the coil assembly and the yoke 111.

according to the present invention, the upper end face of the movable iron core 201 at the initial position is set as not lower than the upper edge of the lower magnetic conductive inner sleeve 114 and not higher than ¼ of the distance from the upper edge of lower magnetic conductive inner sleeve 114 to the lower edge of upper magnetic conductive inner sleeve 113, so as to increasing the electromagnetic suction force of the solenoid valve for water.

Referring to FIG. 3, the valve body assembly of the solenoid valve for water of the present invention includes: a return spring 200 and a movable iron core 201 which are received in a water-isolating sleeve; a flow-through hole valve plug rubber 202; a valve plug 203; a valve plug rubber 204; a valve body 205, a mounting rack 206, a pressure relief ring 207, a rubber gasket 208, and a filter screen assembly 209, etc. Since these components of the valve body assembly of the solenoid valve for water are all components of an existing solenoid valve for water, and the connection relationship thereof is also substantially the same as that in the prior art, it falls within the prior art. For the sake of brevity, a detailed description of what is considered to be prior art is omitted.

According to the present invention, by setting the length of the movable iron core in the lower magnetic conductive inner sleeve in the initial position to be not less than ¼ of a sum of the heights of the upper magnetic conductive inner sleeve and the lower magnetic conductive inner sleeve, so as to ensure that the magnetic conduction of the non-operating air gap is not too small, avoiding magnetic saturation of the iron core, and improving the ability of the solenoid valve for water to withstand a large impulse current impact.

Specific parameters of the present invention for achieving the above-mentioned improvement of the magnetic circuit structure include: the gap between the upper and lower magnetic conductive inner sleeves is between 2 mm and 5 mm; the diameter of the movable iron core is reduced from 6 mm to 5±0.1 mm; the inner diameter of the upper magnetic conductive inner sleeve and the lower magnetic conductive inner sleeve is 6.5±0.1 mm, the wall thickness is 1 mm, and the outer diameter is 8.5±0.1 mm; the inner diameter of water-isolating sleeve is 5.5±0.1 mm, and the outer diameter is 6.5±0.1 mm; and the weight of the magnetic conductive seat is not less than 60% of the weight of the movable iron core, so as to appropriately increase the magnetic conductive seat, increase the electromagnetic suction force, and enhance the reliability of valve suction.

Figure 4:
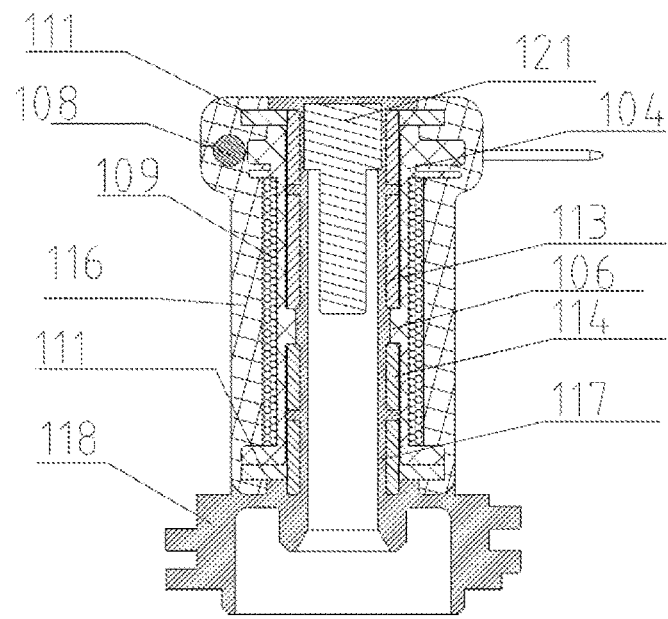
FIG. 4 is a sectional view of a plastic-sealed stator assembly of the solenoid valve for water of the present invention.

Referring to FIG. 4, the present invention can form a water-isolating sleeve inside the upper and lower magnetic conductive inner sleeves 113 and 114 by injecting plastic inside the upper and lower magnetic conductive inner sleeves 113 and 114 mounted in the coil assembly.

FIG. 5 to FIG. 11 show a specific process of forming a water-isolating sleeve inside the upper and lower magnetic conductive inner sleeves 113 and 114 according to the present invention.

Figures 5, 6:
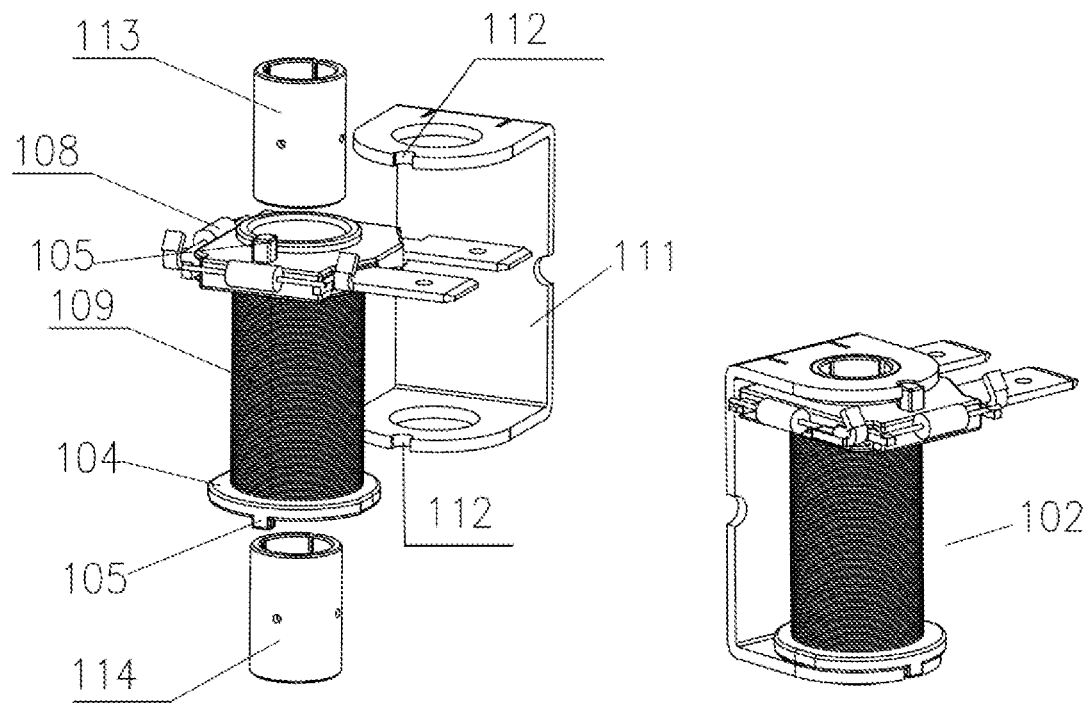
FIG. 5 is an exploded view of the stator assembly of the solenoid valve for water of the present invention.
FIG. 6 is a perspective view of a stator assembly of the solenoid valve for water of the present invention.

As shown in FIG. 5, an upper magnetic conductive inner sleeve 113 and a lower magnetic conductive inner sleeve 114 are mounted on a cavity on the coil assembly, and a magnetic conductive inner sleeve positioning ring 106 (see FIG. 4) in a hole in the coil rack 104 defines the upper magnetic conductive inner sleeve 113 and the lower magnetic conductive inner sleeve 114 at a position capable of contacting the magnetic yoke 111; then, the yoke positioning grooves 112 of the yoke 111 are engaged with the yoke positioning bosses 105 of the upper and lower end faces of the coil rack 104, so that the yoke 111 is positioned on the coil rack 104 on the one hand and closely contacted and coupled with the upper and lower magnetic conductive inner sleeves 113 and 114 on the other hand, thereby forming the stator assembly 102 shown in FIG. 6.

Compared with the prior art, the present invention can reduce the welding process of welding the yoke 111 to the upper and lower magnetic conductive inner sleeves, and can reduce one yoke. However, in the prior art, it is necessary to weld the upper magnetic conductive inner sleeve with one yoke, weld the lower magnetic conductive inner sleeve with the other yoke, and then butt join the two yokes (there might be a quality problem that the butt joint cannot be achieved). Thus, according to the present invention, the steps can be reduced, the cost can be reduced, and the product quality can be improved.

Figures 7, 8:
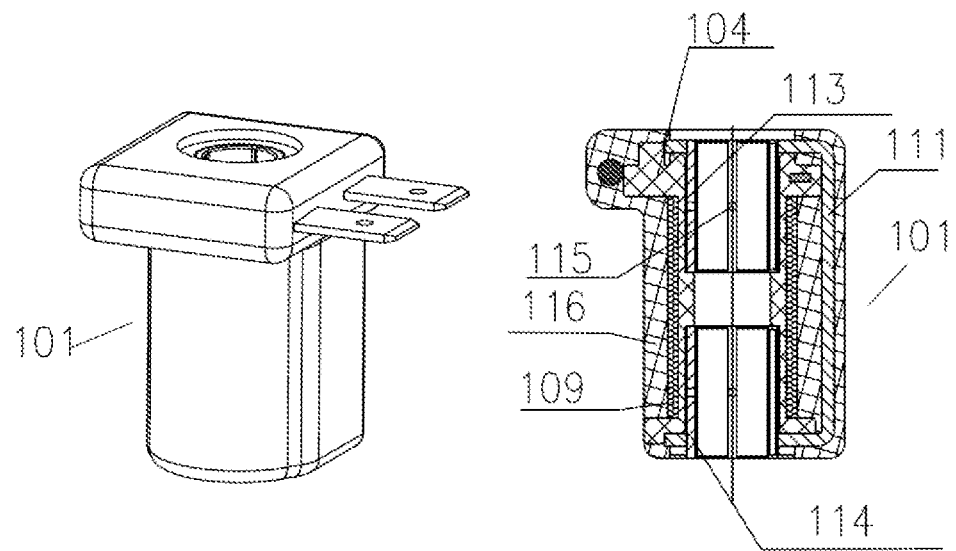
FIG. 7 is a perspective view of a primary plastic-sealed stator assembly formed by firstly injecting plastic on the stator assembly of the solenoid valve for water of the present invention.
FIG. 8 is a cross-sectional view of a primary plastic-sealed stator assembly of the solenoid valve for water of the present invention.
Figures 9A, 9B:
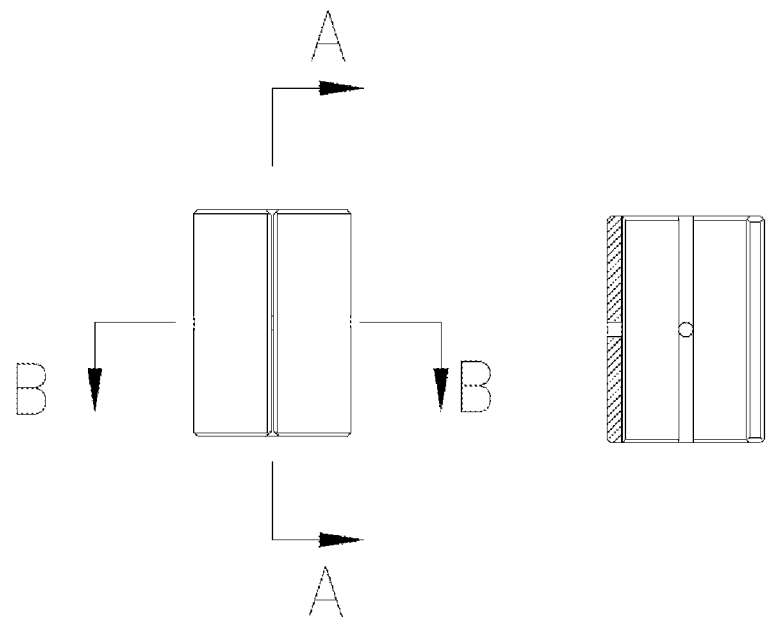
FIG. 9a is a front view of a first embodiment of an upper magnetic conductive inner sleeve of the solenoid valve for water of the present invention.
FIG. 9b is a sectional view A-A of FIG. 9a of the present invention.
Figures 9C, 9D:
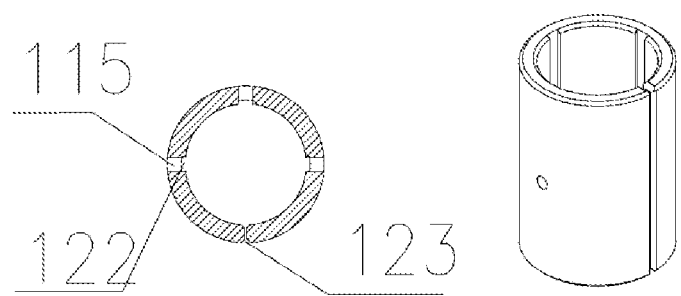
FIG. 9c is a sectional view B-B of FIG. 9a of the present invention.
FIG. 9d is a perspective view of a first embodiment of an upper magnetic conductive inner sleeve of the solenoid valve for water of the present invention.
Figure 10:
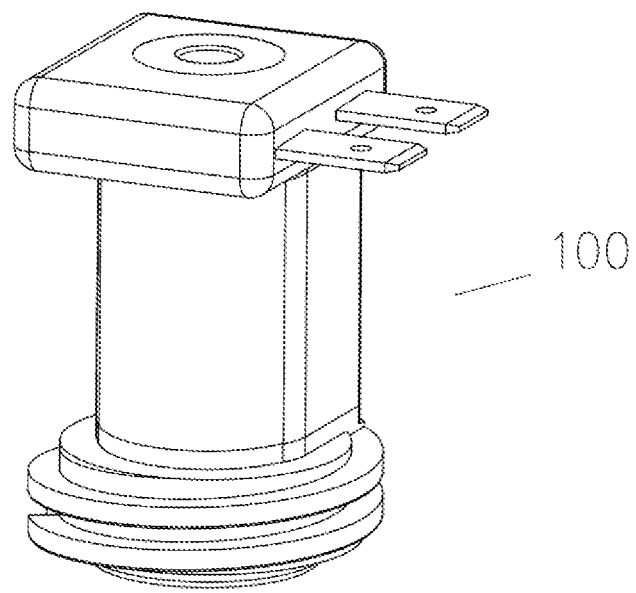
FIG. 10 is a perspective view of a stator assembly with a water-isolating sleeve formed by a primary plastic-sealed stator assembly of the solenoid valve for water which has been subjected to a secondary plastics-packing of the present invention.
Figure 11:
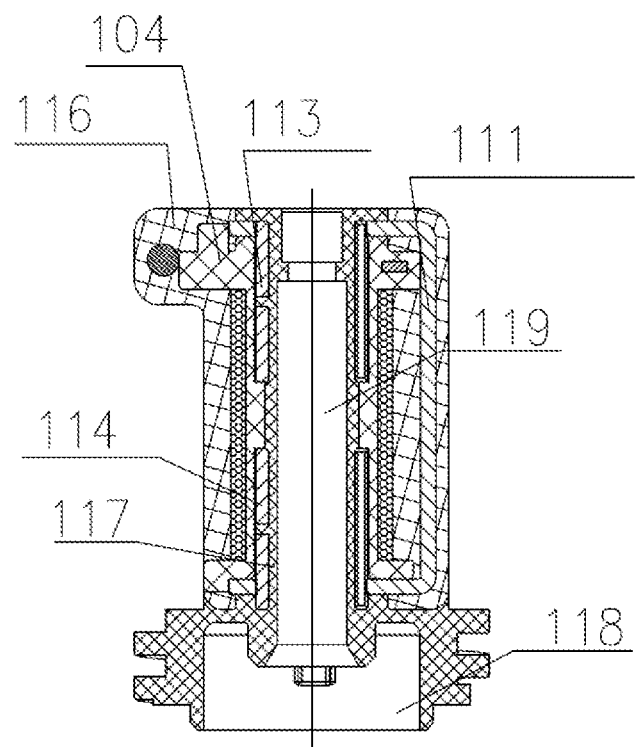
FIG. 11 is a cross-sectional view of a stator assembly with a water-isolating sleeve of the solenoid valve for water of the present invention.

In the present invention, the stator assembly 102 is used as a base or an insert, and plastic is injected on the stator assembly 100 with a water-isolating sleeve, comprising:

by putting the stator assembly 102 shown in FIG. 6 into the mold and injecting plastic for the first time, the coil winding 109, the yoke 111 and the electronic component 108 are wrapped with plastic, but the insert 107 and the hole in the coil rack 125 with the upper magnetic conductive inner sleeve 113 and the lower magnetic conductive inner sleeve 114 are exposed, thus forming the primary plastic-sealed assembly 101 shown in FIGS. 7 and 8;

By putting the primary plastic-sealed assembly 101 into another mold and injecting plastic for the second time, the water-isolating sleeve 117 is formed on the hole in the coil rack 125 with the upper magnetic conductive inner sleeve 113 and the lower magnetic conductive inner sleeve 114, so as to manufacture the integrated stator assembly 100 with water-isolating sleeve as shown in FIGS. 10 and 11.

FIG. 11 shows the structure of the integrated stator assembly 100 having a water-isolating sleeve.

The yoke 111 is tightly fixed to the coil assembly 103 by a plastic-sealed layer 116, and the water-isolating sleeve 117 is injection molded on the inner walls of the upper and lower magnetic conductive inner sleeves 113 and 114, so that the water-isolating sleeve 117 having a thickness of about 0.5 mm is formed in the hole of the coil rack, that is, the present invention reduces the thickness of the water-isolating sleeve 117 by the injection-plastic process. The present invention can greatly reduce the gap between the movable iron core 201 and the magnetic conductive inner sleeve, and increase the electromagnetic force acting on the movable iron core 201, with respect to the water-isolating sleeve of 1.7 mm thick in the prior art.

In addition, in the second injection plastic, the base 118 of the water-isolating sleeve having external threads is also injection molded so that the integrated stator assembly 100 having a water-isolating sleeve can be screwed onto the valve body 205 having internal threads when assembling the solenoid valve for water, see FIG. 11.

The magnetic conductive seat 121 is then mounted within the upper magnetic conductive inner sleeve 113 to form the plastic-sealed stator assembly shown in FIG. 4.

FIGS. 9a-9d show the structure of the upper and lower magnetic conductive inner sleeves of the present invention. The upper magnetic conductive inner sleeve 113 and the lower magnetic conductive inner sleeve 114 of the present invention are cylindrical, and its wall is provided with a radial through-hole 115 for glue passing, and the inner surface of the cylinder wall is provided with an magnetic conductive inner sleeve axial groove 122 (for facilitating the flow of hot melt plastic during injection-plastic), and the magnetic conductive inner sleeve axial groove 122 communicates with the radial through-hole 115. By injecting plastic in the hole of the coil rack having the upper and lower magnetic conductive inner sleeves, the injected plastic used to form the water-isolating sleeve flows along the upper and lower magnetic conductive inner sleeve axial grooves 122 into the magnetic conductive inner sleeve through hole 115, forming a root for positioning the water-isolating sleeve 117, such that the water-isolating sleeve 117 is firmly secured to the upper and lower magnetic conductive inner sleeves 113, 114 that have been positioned by the magnetic conductive inner sleeve positioning ring 106.

In addition, the present invention may further provide a plurality of circumferential grooves (not shown) on the inner surfaces of the upper and lower magnetic conductive inner sleeves 113 and 114 for further fixing the water-isolating sleeve using the radial grooves when the water-isolating sleeve is plastic sealed.

Figure 12:
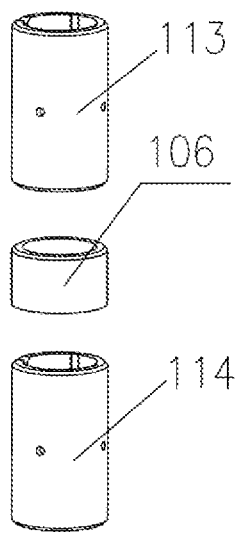
Figure 13:
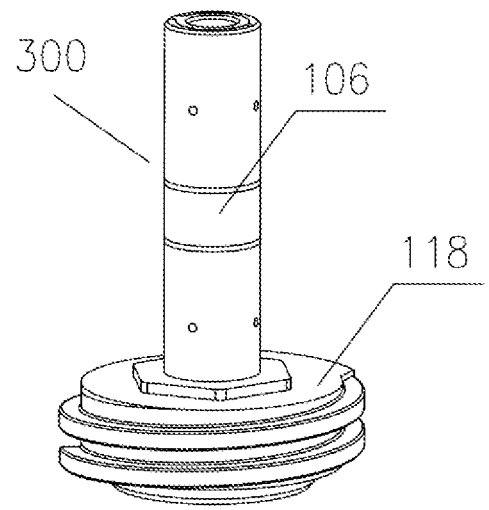
Figure 14:
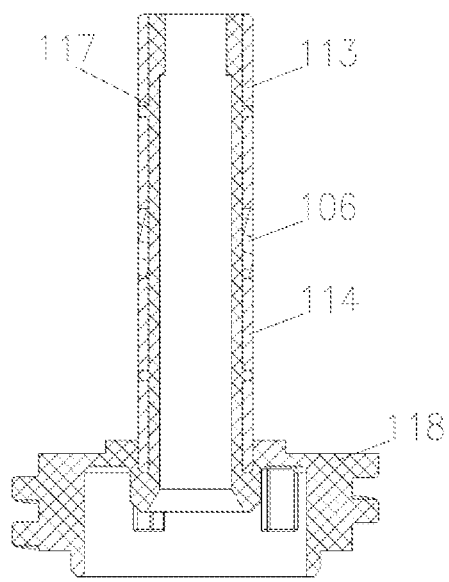

FIGS. 12-14 illustrate another embodiment of the present invention for forming a water-isolating sleeve. First, the upper magnetic inner sleeve 113, the stopper 106 and the lower magnetic inner sleeve 114 are placed together (as shown in FIG. 12). Second, the upper magnetic inner sleeve 113, the stopper 106 and the lower magnetic inner sleeve 114, which are placed together, are used as inserts for injecting plastic, so as to manufacture a water-isolating sleeve assembly including the water-isolating sleeve formed inside the upper magnetic inner sleeve and the lower magnetic inner sleeve (see FIGS. 13 and 14). Then, the water-isolating sleeve assembly is installed into the hole in the coil assembly and plastic is injected, thus forming the plastic-sealed stator assembly as shown in FIG. 4.

Compared with a technology of "injection molding the upper and lower magnetic conductive inner sleeves as inserts together with the water jacket and the bobbin", the realization method of the water inlet solenoid valve of the present invention can greatly reduce the working air gap, because the water-isolating sleeve of the present invention is formed by injecting palstic in the hole of the coil rack, and a very thin water isolating sleeve can be formed. The technology of "injection molding the upper and lower magnetic inner sleeves as inserts together with the water jacket and the bobbin" is that "the magnetic inner sleeve, the water jacket and the coil rack are injection molded into an integrated part", so it is necessary to manufacture separate water jacket, coil rack and magnetic inner sleeve; Considering factors such as manufacturing process and strength, the water jacket must have a certain thickness, so that its thickness is greater than that of the water-isolating sleeve of the present invention which plastic is injected in the hole of the coil rack. In addition, the technology of "injection molding the upper and lower magnetic inner sleeves as inserts together with the water jacket and the bobbin" can not package the yoke, the coil winding, the insert, the coil rack, the magnetic inner sleeve and the water-isolating sleeve together to form an integrated stator assembly.

The present invention also provides a solenoid valve for water with increasing electromagnetic suction force, made according to the above method, which comprises:

a plastic-sealed stator assembly;
a valve body assembly comprising a movable iron core for assembling with the plastic-sealed stator assembly to form the solenoid valve for water;
as shown in FIG. 3, the plastic-sealed stator assembly of the present invention comprises: a coil assembly having a coil rack 104, a coil winding 109 wound on the coil rack 104, an insert 107 and an electronic component 108 mounted on the coil rack 104 (see FIG. 5); an upper magnetic conductive inner sleeve 113 and a lower magnetic conductive inner sleeve 114 mounted in the hole of the coil assembly; a water-isolating sleeve 117 located inside the upper magnetic conductive inner sleeve 113 and the lower magnetic conductive inner sleeve 114; a yoke 111 located outside the coil assembly and connecting the upper magnetic conductive inner sleeve 113 and the lower magnetic conductive inner sleeve 114; a magnetic conductive seat 121 mounted inside the upper water-isolating sleeve 117; and a plastic-sealed layer 116 covering the coil assembly and the yoke 111.

according to the present invention, the upper end face of the movable iron core 201 at the initial position is set as not lower than the upper edge of the lower magnetic conductive inner sleeve 114 and not higher than ¼ of the distance from the upper edge of lower magnetic conductive inner sleeve 114 to the lower edge of upper magnetic conductive inner sleeve 113, so as to increasing the electromagnetic suction force of the solenoid valve for water.

Referring to FIG. 3, the valve body assembly of the solenoid valve for water of the present invention includes: a return spring 200 and a movable iron core 201 which are received in a water-isolating sleeve; a flow-through hole valve plug rubber 202; a valve plug 203; a valve plug rubber 204; a valve body 205, a mounting rack 206, a pressure relief ring 207, a rubber gasket 208, and a filter screen assembly 209, etc.

According to the present invention, the upper end face of the movable iron core at the initial position is set as not lower than the upper edge of lower magnetic conductive inner sleeve and not higher than ¼ of the distance from the upper edge of lower magnetic conductive inner sleeve to the lower edge of upper magnetic conductive inner sleeve, so as to enhance the electromagnetic suction force of the solenoid valve for water.

According to the present invention, by setting the length of the movable iron core in the lower magnetic conductive inner sleeve in the initial position to be not less than ¼ of a sum of the heights of the upper magnetic conductive inner sleeve and the lower magnetic conductive inner sleeve, so as to ensure that the magnetic conduction of the non-operating air gap is not too small, avoiding magnetic saturation of the iron core, and improving the ability of the solenoid valve for water to withstand a large impulse current impact.

Specific parameters of the present invention for achieving the above-mentioned improvement of the magnetic circuit structure include: the gap between the upper and lower magnetic conductive inner sleeves is between 2 mm and 5 mm; the diameter of the movable iron core is reduced from 6 mm to 5±0.1 mm; the inner diameter of the upper magnetic conductive inner sleeve and the lower magnetic conductive inner sleeve is 6.5±0.1 mm, the wall thickness is 1 mm, and the outer diameter is 8.5±0.1 mm; the inner diameter of water-isolating sleeve is 5.5±0.1 mm, and the outer diameter is 6.5±0.1 mm; and the weight of the magnetic conductive seat is not less than 60% of the weight of the movable iron core, so as to appropriately increase the magnetic conductive seat, increase the electromagnetic suction force, and enhance the reliability of valve suction.

Moreover, according to the present invention, the water-isolating sleeve inside the upper and lower magnetic conductive inner sleeves is formed by injecting plastic on the inner surfaces of the upper and lower magnetic conductive inner sleeves.

Alternatively, the invention can also place the upper magnetic inner sleeve, the stopper and the lower magnetic inner sleeve together as an insert, and perform injection molding on them to form the water-isolating sleeve assembly which is installed in the hole of the coil assembly and includes water-isolating sleeve formed by injection molding on the inner surfaces of the upper magnetic inner sleeve and the lower magnetic inner sleeve.

On the other hand, the upper magnetic conductive inner sleeve 113 and the lower magnetic conductive inner sleeve 114 of the present invention are cylindrical, and its wall is provided with a radial through-hole 115 for glue passing. the inner surface of its wall is provided with an magnetic conductive inner sleeve axial groove 122, and the magnetic conductive inner sleeve axial groove 122 communicates with the radial through-hole 115. By injecting plastic in the hole of the coil rack having the upper and lower magnetic conductive inner sleeves, the injected plastic used to form the water-isolating sleeve flows along the upper and lower magnetic conductive inner sleeve axial grooves 122 into the magnetic conductive inner sleeve through hole 115, forming a root for positioning the injection molded water-isolating sleeve 117.

According to the experimental study of the inventor, the magnetic circuit structure of the solenoid valve for water is designed in such a size that, while not affecting the low-pressure starting performance of the valve, the consumables can be reduced and the cost can be reduced. The diameter of the movable iron core is reduced from 6 mm to 5±0.1 mm; the inner diameter of the water-isolating sleeve is 5.5±0.1 mm, the wall thickness is 0.5 mm, and the outer diameter is 6.5±0.1 mm; the inner diameter of the upper and lower magnetic conductive inner sleeves is 6.5±0.1 mm, the wall thickness is 1 mm, and the outer diameter is 8.5±0.1 mm; the aperture in the hole in the coil rack is about 8.7 mm.

Since the water-isolating sleeve vibrates due to the action of the movable iron core during the operation of the valve, the coil rack needs to meet certain rigidity requirements to prevent damage. According to the provisions of GB14536.1-2008 "Electrical automatic controllers for household and similar purposes" and GB 4706.1-2005 "Safety of electrical appliances for household and similar purposes", the magnetic yoke of water inlet valve is exposed and accessible to human hands. In order to meet the requirements for insulation, the skeleton wall thickness must be greater than 0.7 mm. The magnetic yoke of the water inlet valve of the present invention is plastic-sealed, which can't be touched by human hands, and the skeleton has no thickness requirement, and only needs to ensure the strength so as not to be deformed when winding, so that the thickness of the skeleton can be minimized.

Since the invention adopts the manufacturing process of water-isolating sleeve injection molding, the water-isolating sleeve is formed by injecting plastic on the stator assembly and is integrated with the coil rack, and the wall thickness of the coil rack is not limited by the national standard, the wall thickness of the hole in the coil rack is reduced from 1 mm to 0.4 mm, so that the coil diameter is further reduced, and the amount of copper wire is further reduced under the condition that the number of winding turns and the wire diameter are unchanged.

Moreover, as the movable iron core becomes smaller and lighter, when the coil winding 109 is energized, the noise generated by the attraction between the magnetized magnetic seat 121 and the movable iron core 201 also decreases.

It should be noted that the injection-molding process of the water-isolating sleeve used in the solenoid valve for water of the present embodiment is merely illustrative of the manufacturing process of the solenoid valve for water, and does not limit the magnetic circuit structure. The magnetic circuit structure improvement method of the present invention is effective for all solenoid valve for waters in enhancing the solenoid attraction force at start-up, reducing the wire consumption and reducing the noise generated by moving iron core suction under the condition of meeting the minimum start-up voltage requirements.

Although the present invention has been described in detail above, the present invention is not limited thereto, and various modifications can be made by a person skilled in the art according to the principles of the present invention. Thus, modifications made in accordance with the principles of the present invention should be understood to fall within the scope of the invention.

The invention claimed is:

1. A method of manufacturing a water inlet solenoid valve for enhancing a electromagnetic suction force, comprising:
   obtaining a plastic-sealed stator assembly by injecting plastic on a stator assembly, comprising:
   mounting an upper magnetic conductive inner sleeve and a lower magnetic conductive inner sleeve mounted in a hole of a coil assembly;
   by injecting plastic on an inner surface of the upper magnetic conductive inner sleeve and the lower magnetic conductive inner sleeve, forming a water-isolating sleeve on the inner surface of the upper magnetic conductive inner sleeve and lower magnetic conductive inner sleeve;
   mounting a yoke located outside the coil assembly and connecting the yoke with the upper magnetic conductive inner sleeves and the lower magnetic conductive inner sleeve;
   mounting a magnetic conductive seat on an inner side of the water-isolating sleeve; and
   by injecting plastic on the coil assembly and the yoke , forming a plastic-sealed layer used to cover the coil assembly and to tightly connect the yoke with the upper magnetic conductive inner sleeve and lower magnetic conductive inner sleeve;
      assembling the plastic-sealed stator assembly and a valve body assembly comprising a movable iron core together to form the water inlet solenoid valve;
      wherein an upper end face of the movable iron core at an initial position is slightly higher than an upper edge of the lower magnetic conductive inner sleeve, so as to enhance the electromagnetic suction force of the water inlet solenoid valve.

2. The method according to claim 1, wherein a gap between the upper magnetic conductive inner sleeve and the lower magnetic conductive inner sleeve is between 2 mm and 5 mm; a diameter of the movable iron core is reduced from 6 mm to 5±0.1 mm; an inner diameter of the upper magnetic conductive inner sleeve and the lower magnetic conductive inner sleeve is 6.5±0.1 mm, a wall thickness of the upper magnetic conductive inner sleeve and the lower magnetic conductive inner sleeve is 1 mm, and an outer diameter of the upper magnetic conductive inner sleeve and the lower magnetic conductive inner sleeve is 8.5±0.1 mm; the water-isolating sleeve has an inner diameter of 5.5±0.1 mm and an outer diameter of 6.5±0.1 mm; and a weight of the magnetic conductive seat is not less than 60% of a weight of the movable iron core.

3. The method according to claim 1, wherein a water-isolating sleeve assembly comprising a water-isolating sleeve formed inside the upper magnetic conductive inner sleeve and the lower magnetic conductive inner sleeve is manufactured by injecting plastic on the upper magnetic conductive inner sleeve, a stopper and the lower magnetic conductive inner sleeve placed together as an insert; the water-isolating sleeve assembly is then mounted into a hole of the coil assembly and injection plastic is carried out.

4. The method according to claim 1, wherein the upper magnetic conductive inner sleeve and the lower magnetic conductive inner sleeve are a shape of cylinder and a wall of the cylinder is provided with radial through holes for glue passage.

5. The method according to claim 4, wherein the inner surfaces of the upper magnetic conductive inner sleeve and the lower magnetic conductive inner sleeve are provided with axial magnetic conductive inner sleeve grooves that communicate with the radial through holes.

6. The method according to claim 5, wherein by injecting plastic into the hole of the coil rack provided with the upper magnetic inner sleeve and the lower magnetic inner sleeve, the injected plastic used for forming the water-isolating sleeve flows into the radial through hole along the axial magnetic conductive inner sleeve grooves, thus forming the root for fixing the water-isolating sleeve.

7. A water inlet solenoid valve for enhancing a electromagnetic suction force, which comprises:
- a plastic-sealed stator assembly comprising:
- a coil assembly;
- an upper magnetic conductive inner sleeve and a lower magnetic conductive inner sleeve mounted in a hole of the coil assembly;
- a water-isolating sleeve formed by injecting plastic into an inner surface of the upper magnetic conductive inner sleeve and the lower magnetic conductive inner sleeve;
- a yoke located outside the coil assembly and connecting the upper magnetic conductive inner sleeves and the lower magnetic conductive inner sleeves;
- a magnetic conductive seat mounted on an inner side of the water-isolating sleeve; and
- a plastic-sealed layer used to cover the coil assembly and to tightly connect the yoke with the upper magnetic conductive inner sleeve and lower magnetic conductive inner sleeve;
- a valve body assembly comprising a movable iron core, for assembling with the plastic-sealed stator assembly to form the water inlet solenoid valve;
- wherein an upper end face of the movable iron core at an initial position is slightly higher than an upper edge of lower magnetic conductive inner sleeve, so as to enhance the electromagnetic suction force of the water inlet solenoid valve.

8. The water inlet solenoid valve according to claim 7, wherein a gap between the upper magnetic conductive inner sleeve and the lower magnetic conductive inner sleeve is between 2 mm and 5 mm; a diameter of the movable iron core is reduced from 6 mm to 5±0.1 mm; an inner diameter of the upper magnetic conductive inner sleeve and the lower magnetic conductive inner sleeve is 6.5±0.1 mm, a wall thickness of the upper magnetic conductive inner sleeve and the lower magnetic conductive inner sleeve is 1 mm, and an outer diameter of the upper magnetic conductive inner sleeve and the lower magnetic conductive inner sleeve is 8.5±0.1 mm; the water-isolating sleeve has an inner diameter of 5.5±0.1 mm and an outer diameter of 6.5±0.1 mm; and a weight of the magnetic conductive seat is not less than 60% of a weight of the movable iron core.

9. The water inlet solenoid valve according to claim 7, wherein a water-isolating sleeve assembly comprising a water-isolating sleeve formed inside the upper magnetic conductive inner sleeve and the lower magnetic conductive inner sleeve is manufactured by injecting plastic on a upper magnetic conductive inner sleeve, a stopper and the lower magnetic conductive inner sleeve placed together as an insert; the water-isolating sleeve assembly is then mounted into a hole of the coil assembly.

10. The water inlet solenoid valve according to claim 7, wherein the upper magnetic conductive inner sleeve and the lower magnetic conductive inner sleeve are a shape of a cylinder and the wall of the cylinder is provided with radial through holes for glue passage.

11. The water inlet solenoid valve according to claim 10, wherein the inner surfaces of the upper magnetic conductive inner sleeve and the lower magnetic conductive inner sleeve are provided with magnetic conductive inner sleeve axial grooves that communicate with the radial through holes.

12. The water inlet solenoid valve according to claim 11, wherein by injecting plastic into the hole of the coil rack provided with the upper magnetic inner sleeve and the lower magnetic inner sleeve, the injected plastic used for forming the water-isolating sleeve flows into the radial through hole along the axial magnetic conductive inner sleeve grooves, thus forming the root for fixing the water-isolating sleeve.

* * * * *